Figure 5:
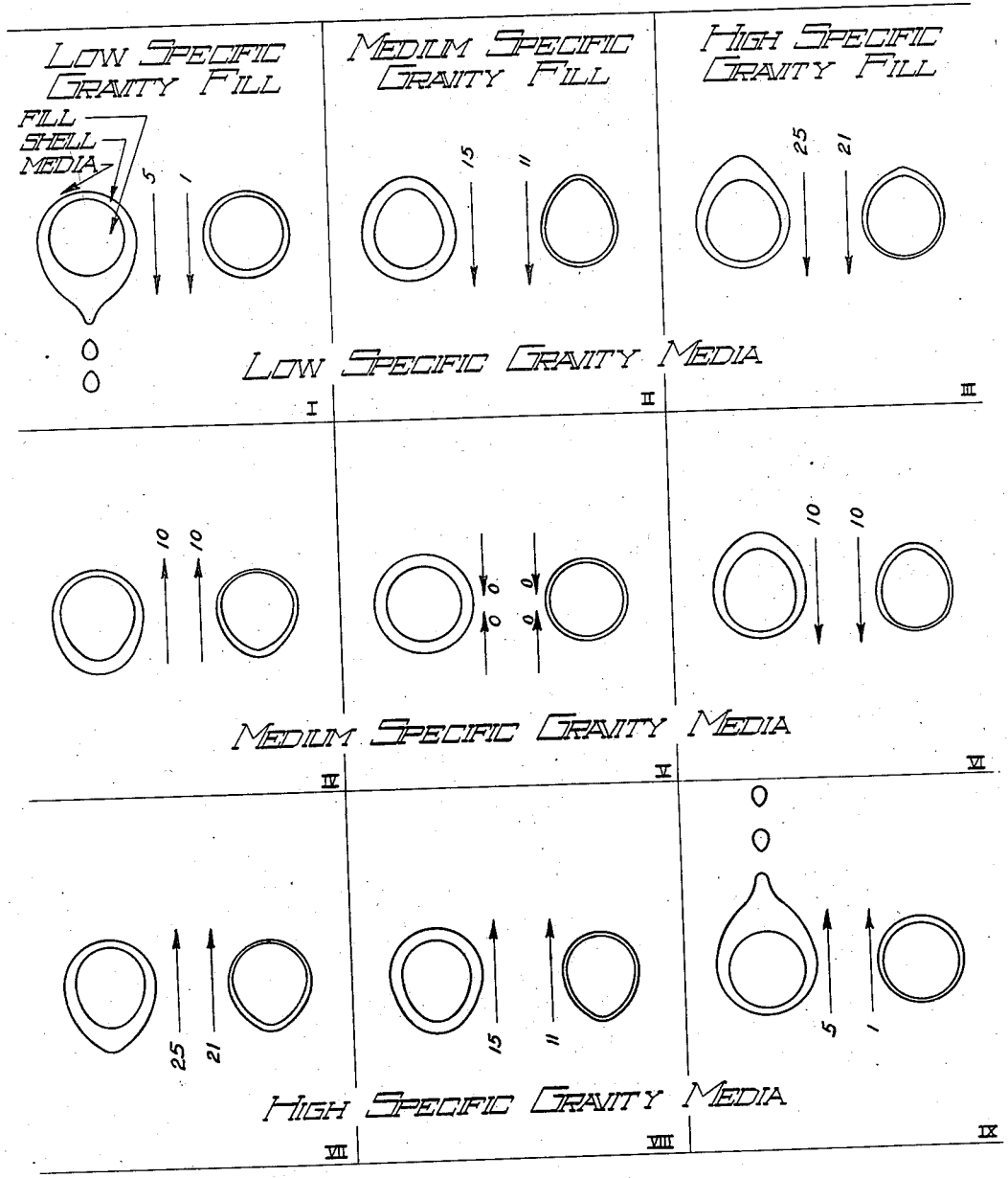

Oct. 26, 1943.   R. P. SCHERER   2,332,671
FABRICATING OF FILLED SEALED CAPSULE
Filed Dec. 20, 1939   3 Sheets-Sheet 1
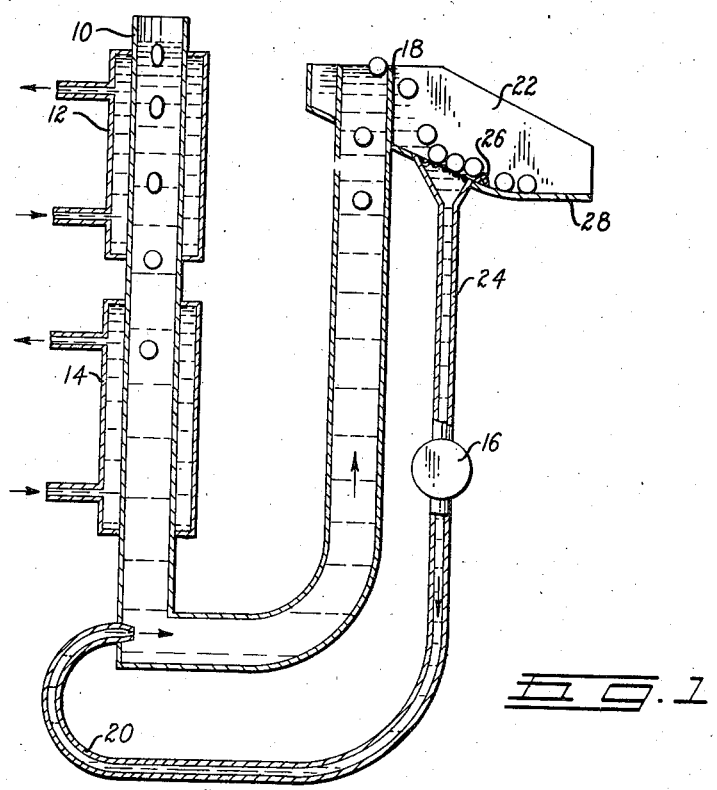
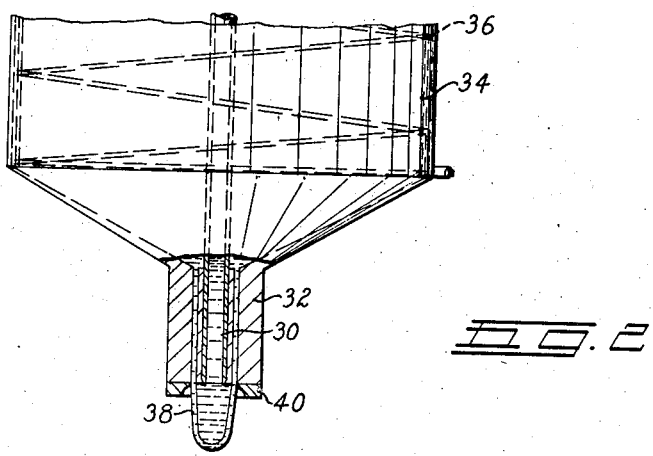
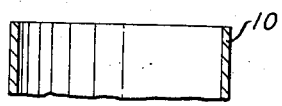
ROBERT P. SCHERER INVENTOR.
BY Parker & Burton
ATTORNEY.

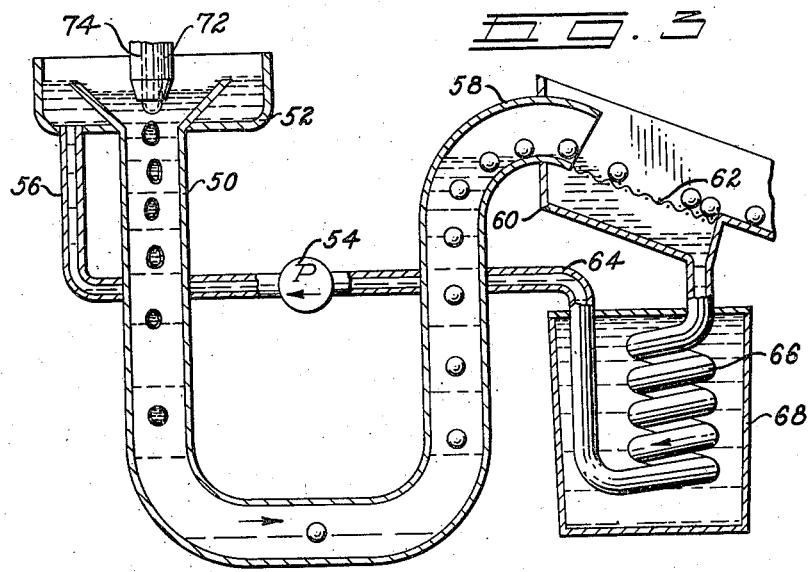
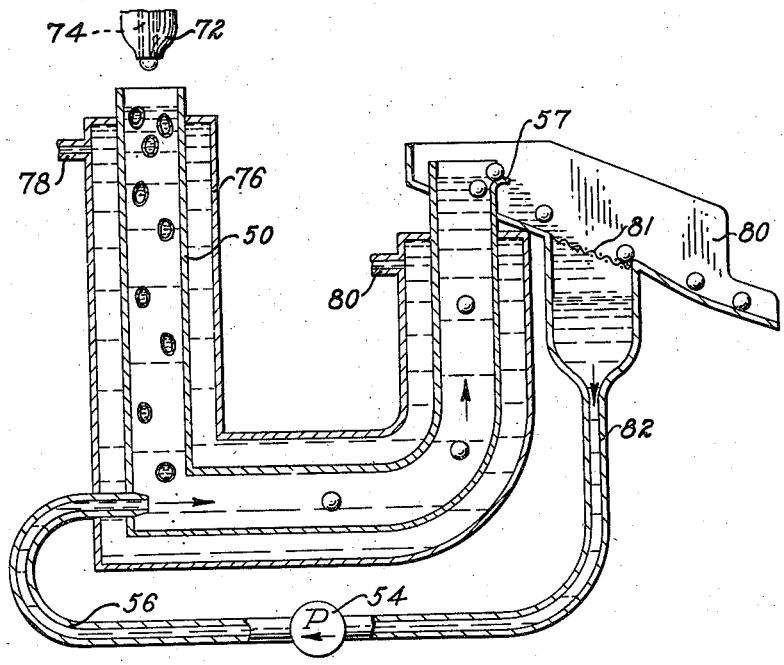

Patented Oct. 26, 1943

2,332,671

UNITED STATES PATENT OFFICE 2,332,671

FABRICATION OF FILLED SEALED CAPSULES

Robert P. Scherer, Detroit, Mich.

Application December 20, 1939, Serial No. 310,259

16 Claims. (Cl. 18—56)

This invention relates to improvements in the fabrication of filled capsules and particularly capsules having a seamless capsule shell formed of gelatin or some other plastic substance and generally of a spherical shape.

More particularly, it relates to improvements in the fabrication of the generic product described in my application Serial No. 299,627, filed October 16, 1939.

In such application a process of fabricating filled seamless capsules was described wherein the capsules were caused to pass suspended through a liquid column while the capsule shells were in a plastic condition responsive to surface tension. Preferably the specific gravity of the filled capsule as a unit and the specific gravity of the suspending liquid medium approached closely to each other whereby within a column of reasonable height the shell would respond to surface tension to assume a substantially uniform thickness and, if the content substance permitted, a generally spherical shape.

It has been found that not only is it desirable that the filled capsule as a unit have a specific gravity closely approaching that of the suspending liquid, in order that the process may be commercially carried out within a column of liquid of reasonable height and without damage to the filled capsules so formed, but that the specific gravity of the content substance and the specific gravity of the capsule shell substance be controlled within close limits approaching each other.

Different content substances are commercially capsulated. These substances may vary substantially as to specific gravity as to each other and may vary substantially as to specific gravity with respect to any particular plastic shell material. Oils may be used as content substances which have a specific gravity substantially lower than that of the gelatin solution which is commonly used as a shell substance. On the other hand, content substances may be used which have a specific gravity substantially higher than that of the shell substance.

One object of this invention is to control the relative specific gravities of the content substance and the shell substance to bring them into close relationship to provide a filled capsule of better and more uniform structure and shape. An object is to provide by the process set forth a filled sealed capsule wherein the plastic shell has the proper thickness as well as substantial uniformity of thickness and shape to serve its desired purpose.

A further object lies in the provision of a process wherein control is exercised over the suspending liquid medium; the material of which the shell is formed and the content substance so as to attain a relatively high interfacial tension between the shell and the content substance on the one hand and the suspending medium on the other hand to improve the capsules formed by the process.

The combined specific gravity of the shell material and the content substance should be maintained at approximately the specific gravity of the suspending fluid through which the filled capsule is passed and control may therefore be exercised over the specific gravity of the suspending medium as well as over the specific gravity of the shell material and content substance to accomplish the desired results.

Another object relates to the provision of an improved filled capsule wherein the content substance and shell material are so characterized as to provide a capsule particularly responsive to the treatment herein set forth.

Other objects, advantages, and meritorious features will more fully appear from the following specification, appended claims, and accompanying drawings, wherein:

Figure 1 is a diagrammatic sectional view through a simple form of apparatus capable of carrying out the process of my invention, Fig. 2 is a diagrammatic elevational view partly in section capable of carrying out the invention disclosed in conjunction with the apparatus of Fig. 1, Figs. 3 and 4 are sectional views of simple apparatus forms capable of carrying out my improved process in a modified manner, Fig. 5 is a diagrammatic chart illustrating varying effects upon capsule structures under varying conditions and physical characteristics of the capsule shell and/or content substance and capsule suspending medium.

Generically, the process is of the same character as that described in my application Serial No. 299,627 and the first two figures of the drawings are the same as those in such application. Figs. 3 and 4 illustrate modifications in apparatus to obtain modifications in functioning of the process. It is believed that a better understanding of the invention will be obtained by first considering the diagram chart of Fig. 5.

In the fabrication of filled seamless plastic shell capsules by passage of the filled capsule through a liquid column and with the shell in a plastic state it is not only desirable to control the specific gravity of the suspending medium with respect to the specific gravity of the filled capsule as a whole but it is desirable to maintain a definite and preferably very close approximation between the specific gravity of the shell and that of the content substance.

While gelatin is hereinafter mentioned as the sheet material in the discussion of specific gravity and interfacial tension it is obvious that other thermoplastic materials such as some of the thermoplastic resins might be used.

Certain oils, solutions, mixtures or electrolytes may be used as the suspending medium. Carbon tetrachloride and carbon bisulfide may be used. Mineral oil or petroleum fractions may be used. Compatible mixtures can be prepared to provide a suspending medium having the desired specific gravity. The suspending medium should not attack the gelatin or be miscible therewith.

Fig. 5 of the drawings illustrates diagrammatically filled capsules exhibiting differences due to variation in the rate of travel of the filled capsules through the liquid suspending medium and variations in the relative specific gravities of the content substance and shell material and variations of each with respect to the suspending medium. These diagrams illustrate the effect due to such variations upon capsules shaped within suspending media and characterized as indicated.

In this figure nine squares identified by Roman numerals are arranged in three vertical columns and three horizontal lines. At the top of each vertical column is indicated the relative specific gravity of the content substance or fill of each capsule for each of the three squares in the column. At the bottom of each horizontal line is indicated the relative specific gravity of the suspending medium within which the capsule is formed for each of the three squares in the line. In each of the nine squares the shell material is of medium specific gravity.

In each square is shown the effect on a thin walled capsule and the effect on a thick walled capsule. As to each square the specific gravities of shell, content substance and suspending medium is the same for the thick and the thin walled capsules. For purposes of comparison it may be considered that in a thin walled capsule the shell material represents $\frac{1}{11}$ of the total capsule volume while for the thick walled capsule the material represents $\frac{3}{2}$ of the total capsule volume.

The specific gravities described are relative only. For purposes of comparison here low specific gravity may be considered as 0.8; medium specific gravity at 1.0; and high specific gravity as 1.2. Arrows within each square show the direction of travel of the capsules within the suspending medium and the numbers appearing alongside the arrows represent relative forces acting upon the capsules to produce movement through the suspending medium. The extent of the tear drop shape of the shell is determined by the rate of rise or descent of the capsule through the suspending medium.

In each square where there is variation between the specific gravity of the fill and the shell the shape of the fill or content globule within the shell more closely approximates the shell in shape in the thin wall capsule than in the thick wall capsule. The thin wall capsule shells show less tear drop formation than do the thick wall capsule shells (less room for the content globule to adjust itself to spherical shape without exerting force on the shell). Where drip or tendency to drip occurs there is a resulting deformation in the shape to the tear drop shape.

It will be noted that in those instances where the specific gravity of the content substance approximates that of the shell material as in those squares in the center column, namely squares II, V, and VIII, the shell structure is relatively uniform and constitutes a wall about the content globule of substantially uniform thickness. In square V, in such column, where the suspending medium, the shell material and the content substance each is of approximately the same specific gravity, the ideal condition is attained. Squares II and VIII show capsules of a tear drop shape.

In the column at the left where the content substance is of low specific gravity (squares I, IV, and VII) and the shell material is of medium specific gravity there is a resulting eccentricity of position of the content globule upwardly within the shell. It is apparent that this result would be accentuated if the shell content material were of high specific gravity. The condition is minimized if the capsule has a relatively thin wall. In all these cases it is assumed that there is a relatively high interfacial tension between the content globule substance and the shell material.

The column at the right, squares III, VI, and IX, where the content substance is of high specific gravity and the shell substance of medium specific gravity, there is again resulting eccentricity of position of the content globule but here it is downwardly within the shell. Again this condition is accentuated in the thick wall capsule as compared with the thin wall capsule.

It will be observed that there is not only variation in the specific gravity of the content substance and shell material but also variation of each such material with respect to the suspending medium. Where the period of suspension is protracted (as is desirable to obtain satisfactory results) there is a tendency for the shell material to slough off as shown in squares I and IX.

In one commercial preparation the gelatin solution has a specific gravity of about 1.15. Content material varies as to specific gravity. For example, cod liver oil in one form commonly used has a specific gravity varying from .922 to .931 and castor oil has a specific gravity varying from .960 to .967. Carbon tetrachloride has a specific gravity of about 1.595.

To increase the density of the oil fluids, fine heavy powders may be suspended therein. In the case of cod liver oil the addition of .826 grain of powdered sugar to 922 grams of cod liver oil will yield a suspension having a specific gravity of about 1.15, which approximates that of the gelatin solution above referred to. Instead of sugar, which has a specific gravity of 1.588, it would be feasible to use such a substance as dicalcium-phosphate (specific gravity 2.306) or titanium dioxide (specific gravity 3.84) in small quantities. Other suitable substances having a specific gravity in excess of the specific gravity of the shell substance (the greater the better since less would be required) and which substances would not be objectionable might be used.

Obviously such specific gravity corrective ingredients should not be objectionable in the content substance environment or reactive with the shell material.

In the case of fluid content materials having a density greater than that of the shell material, a less dense fluid may be added to the heavier one to correct this specific gravity relationship. This might be illustrated with respect to the carbon tetrachloride. The addition of 191 c. c. of carbon tetrachloride will produce a 100 c. c. of carbon tetrachloride will produce a solution having a specific gravity of 1.15. Other oils, such as corn oil or mineral oil might be employed. Many oils having a specific gravity sufficiently low and which are not physically or chemically objectionable in the surrounding environment might be used. Instead of adding the corrective ingredient to the content substance it might be added to the shell material.

Heavy inert powder such as titanium dioxide or di-calcium-phosphate might be added to increase the specific gravity of the shell material either to bring it into correspondence with that of the filling substance or at least partially to accomplish such correction, which correction might be completed by making adjustment in the content material as hereinabove described.

Since gelatin has a specific gravity of approximately 1.27 and water a specific gravity of 1.0 the more water the solution contains the lower the specific gravity of such solution. Control must of course be exercised in this correction within the limits of the manufacturing operation to be carried out. Since an aqueous gelatin solution readily emulsifies with many oils and fluids the specific gravity of the gelatin material can be lowered by emulsifying in the gelatin solution an oil or fluid having a lower specific gravity. Such fluids as mineral oil, corn oil, cotton seed oil, etc., could be employed in this connection.

The interfacial tension between the shell and the suspending medium and between the shell and the content substance should be relatively high. The successful workability of the process is impaired if this interfacial tension is lowered. If the pure materials or mixtures used do not have high interfacial tension in and of themselves certain corrective ingredients may be added thereto to increase the same. If calcium chloride is added to an aqueous gelatin solution it will increase the surface tension at the interface between the gelatin solution and the mineral oil, cotton seed oil, or corn oil. If mineral oil is added to ethyl ether it will increase the interfacial tension between the ether and an aqueous gelatin solution.

The specific gravity control and/or interfacial tension control hereinabove described as exercised over the content substance and the shell material and the suspending medium may be exercised regardless of certain modifications of the process and/or apparatus for carrying out the process. For example, Figs. 1 and 2 illustrate one simple form of apparatus and process wherein capsules 11 are introduced into a liquid column in leg 10 of a U-tube to descend through said liquid column. Following the descent the capsules are picked up in a liquid stream impelled from pump 16 through pipe 20 into the lower end of said leg 10, which stream flows upwardly through leg 18 of the U-tube. With said stream, the capsules spill over the upper end of the U-tube into a hopper 22. Liquid flows back to the pump through the screened entrance to intake pipe 24. The capsules roll over the screen and over the low dam 26 for discharge into a suitable receptacle, not shown.

The upper end of leg 10 of the U tube is provided with a surrounding jacket 12 through which a heated liquid may be circulated to maintain the desired temperature of liquid in the upper end of the leg 10. Spaced below the jacket 12 is a jacket 14 through which a cooling liquid may be circulated. Two strata of liquid at two different temperatures may therefore be provided in the leg 10 of the U tube. The specific gravity of the suspending medium in the U tube or in either leg thereof, if a different liquid is employed in leg 10 than used in the remainder of the tube, may be controlled as hereinabove described.

Filled capsules wherein the relative specific gravity of the content substance and the shell material has been brought under control may be introduced in any desired manner. Capsules may be introduced as complete capsules into the upper end of said leg 10 or apparatus similar to that shown in Fig. 2 may be employed to form and fill capsule bodies and deposit them into the upper end of leg 10 of the tube. In the structure shown in Fig. 2 capsule content substance delivery tube 30 leads from a suitable source of content material, not shown, concentrically through delivery tube 32, which tube 32 leads from a suitable source of molten capsule shell material such as molten gelatin. A hopper 34 is indicated as provided with heating mechanism 36 of any conventional character and is adapted to contain molten gelatin and discharge the same through the delivery tube 32. Conventional controls may be provided to regulate the flow of gelatin and/or content material.

The content substance discharges through the delivery tube 30 to fill the gelatin tubular form extruded through delivery tube 32 as shown at 38. This filled tubular form is pinched off at intervals by pinching or shearing means 40 which may be of any suitable type providing filled tubular sections which drop into the upper end of leg 10 to pass therethrough as above set forth.

Fig. 3 illustrates a modified form of structure wherein there is provided a U-tube 50 which receives liquid from a hopper 52, which hopper is fed with liquid by pump 54 through outlet 56. The liquid flows as a stream through the U tube and discharges from the curved end 58 into a hopper 60 through screen 62 and back to the pump through intake pipe 64. The intake pipe 64 has a coil 66 disposed within a temperature control vat or jacket 68 whereby the temperature of the liquid flowing through the U tube may be regulated as desired.

The specific gravity of a liquid varies with its temperature. Presupposing specific gravity control to be exercised over the liquid medium in the U tube and/or the capsules passing therethrough as herein above described, this specific gravity of the liquid medium may be maintained through control exercised over its temperature. Minus such temperature control the temperature of the suspending medium would increase in use due to heat absorbed from the molten shell capsules deposited therein, assuming that the medium was at a cooling temperature originally.

In this instance the column of liquid may be a cooling column. The capsule 70 may be formed by dripping off from the capsule shell material delivery nozzle 72 and the capsule content substance delivery nozzle 74 successive increments of materials. These nozzles may be fed from a suitable source of supply, not illustrated, by impeller means of conventional construction. The fluid impellers may be provided to deliver at timed intervals determined increments of the two fluids to form the capsule shell and its content globule.

The filled capsule will drop off the nozzle end of the delivery tubes into the liquid medium in the U tube. The nozzles are shown as submerged below the liquid level. Movement of the liquid as a stream through the U tube and over the discharge nozzles will facilitate this dropping of the capsule bodies. It is assumed here that the discharge is downwardly. Of course, if the specific gravity of the suspending medium were higher than that of the capsule bodies discharged thereinto the discharge might be upwardly and the capsule bodies would float upwardly therethrough.

The capsule shell material may be maintained in a molten state by conventional heating mechanism not illustrated. If desired, the capsule content substance may also be maintained at an elevated temperature all within the desired limits of the materials used. The filled capsule is therefore in such a state as to respond to surface tension within the liquid column and to assume a spherical shape, content material permitting, and to harden while it passes along with the moving column of liquid suspending medium.

As the column of liquid is continuously advancing and carries with it the filled capsules rather than having the capsules advance through the column as is the case in connection with the column of liquid in the leg 10 of Fig. 1 the suspending medium may have the same specific gravity as the capsule shell and content material and the best results will therefore be obtained.

In Fig. 4 the U tube 50 is shown as provided with a jacketed portion 76. Liquid at any desired temperature may be circulated through this jacket which is provided with intake and outlet openings 78 and 80. Filled capsules may be dropped into the capsule intake end of the U tube from the delivery nozzles 72 and 74 as described in connection with the apparatus of Fig. 3, but here the discharge nozzles are not submerged.

The liquid in this capsule intake leg of the U tube may be relatively stationary but may have a specific gravity which is slightly below that of the filled capsule at the same temperature. As the capsule enters the liquid column in a molten state it will have a specific gravity which will cause it to remain suspended therein until it cools sufficiently to descend through the column. As it cools it will fall. When it reaches the bottom of the column it is picked up by the stream of liquid impelled by the pump 54 through the discharge pipe 56 into the bottom of the U tube and flows in the direction of the arrow spilling over a curved lip 57 into a hopper 80. The liquid drains back through screen 81 into the intake pipe 82 leading to the pump. The capsules roll over the screen for discharge into a suitable receptacle, not shown.

What I claim:

1. That method of fabricating capsules comprising providing a plastic capsule shell about content substance which substance has a specific gravity not varying substantially from that of the shell material and passing the filled capsules so formed freely through a liquid medium inert with respect to the shell and with the shell in a plastic state and responsive to surface tension to fashion the shell in situ about the content substance.

2. That method of fabricating capsules comprising providing capsule shell material and capsule content material, which materials vary with respect to each other as to specific gravity, adding specific gravity corrective ingredient to one of said materials to bring the specific gravity thereof into substantial agreement with the specific gravity of the other of said materials, capsulating the content material within a capsule shell formed of the shell material and passing said filled capsule through a liquid medium inert to the shell and with the shell in a plastic state and responsive to surface tension to fashion said shell in situ about the content material.

3. That method of fabricating capsules comprising providing capsule shell material having a determined specified gravity, providing capsule content substance having a specific gravity varying appreciably from the specific gravity of the capsule shell material, adding specific gravity corrective ingredient to the content substance to correct its specific gravity into substantial agreement with the specific gravity of the shell material, capsulating the corrected content substance within a capsule shell formed of the shell material and passing said filled capsule through a supporting liquid medium inert to the shell and with the shell in a plastic state and responsive to surface tension to fashion the shell in situ about the content substance.

4. The method of fabricating capsules comprising providing capsule shell material having a determined specific gravity, providing capsule content substance having a specific gravity appreciably lower than that of the shell material, adding to the content substance an ingredient having a substantially higher specific gravity to correct the specific gravity of the content substance into substantial agreement with that of the shell material, capsulating the corrected content substance within a capsule shell formed of the shell material, and passing the filled capsule through a liquid medium inert to the shell and with the shell in a plastic state and responsive to surface tension to fashion the shell in situ about the content substance.

5. The process defined in claim 3 characterized in that the specific gravity corrective ingredient added to the content substance is an ingredient which is chemically inert with respect to the content substance.

6. The invention as defined in claim 2 wherein the specific gravity corrective ingredient which is added goes into solution in the material to which added.

7. The process as defined in claim 2 wherein the capsule shell material is an aqueous gelatin solution having a specific gravity in excess of 1 and wherein the capsule content material includes an oil and has a specific gravity below 1 and wherein the specific gravity corrective ingredient has a specific gravity in excess of that of the gelatin solution and is added to the content substance.

8. The process as defined in claim 2 wherein the capsule shell material comprises an aqueous gelatin solution having a specific gravity in excess of 1 and wherein the capsule content material has a lower specific gravity and wherein the specific gravity corrective ingredient is an emulsifying fluid having a lower specific gravity than the gelatin solution and is added to the gelatin solution to lower its specific gravity into substantial agreement with that of the content material.

9. The process defined in claim 1 wherein the specific gravity of the liquid suspending medium does not vary substantially from the specific gravity of the shell material and/or content substance.

10. That process of fabricating capsules comprising providing a plastic capsule shell about content substance and introducing said filled capsule with the shell in a molten state into a liquid suspending medium inert with respect to the shell and moving said suspending medium as a stream carrying said filled capsules therewith to shape the capsule shell under surface tension and to harden the same.

11. That process as defined in claim 10 characterized in that control is exercised over the capsule shell material, the capsule content substance, and the suspending medium to bring these three possible variables into substantial agreement as to specific gravity.

12. The process as defined in claim 1 wherein the specific gravity of the suspending medium is maintained substantially constant during flotation of the filled capsules therein by controlling the temperature thereof.

13. That process of fabricating capsules comprising introducing a plastic capsule shell filled with content substance directly into submergence within a liquid suspending medium inert to the shell and passing said capsule through said suspending medium with the shell sufficiently plastic to respond to surface tension activity.

14. That process of fabricating capsules comprising introducing a filled capsule consisting of content material enveloped within a shell of plastic material into a column of suspending liquid inert to the shell, said suspending liquid having a specific gravity slightly below that of the capsule at the same temperature, and introducing said capsule into said suspending liquid heated to a higher temperature than the liquid to approach more closely the specific gravity of the liquid and with the shell sufficiently plastic to respond to surface tension activity within the liquid, said capsule adapted to pass through said liquid as it cools and its specific gravity increases.

15. That process of fabricating capsules comprising passing a filled capsule consisting of content material enveloped within a shell of plastic material through a suspending liquid column with the shell sufficiently plastic to respond to surface tension activity within the liquid, and determining the speed at which the capsule travels through the suspending liquid by predetermining the specific gravity of said liquid by addition of specific gravity corrective substance to the liquid.

16. That process of fabricating capsules comprising passing a filled capsule consisting of content material enveloped within a shell of plastic material through a suspending liquid column with the shell sufficiently plastic to respond to surface tension activity within the liquid and exercising control over the travel of the capsule through the suspending liquid by controlling the specific gravity of said liquid by controlling the temperature of said liquid.

ROBERT P. SCHERER.